(12) United States Patent
Issel et al.

(10) Patent No.: US 9,969,880 B2
(45) Date of Patent: May 15, 2018

(54) THERMOPLASTIC ELASTOMER COMPOSITION AND USE THEREOF

(71) Applicants: Carl Freudenberg KG, Weinheim (DE); Unimatec Chemicals Europe GmbH & Co. KG, Weinheim (DE)

(72) Inventors: Hans-Martin Issel, Weinheim (DE); Akihiro Naraki, Kamisohda (JP); Christoph L. Klingshirn, Eppelheim (DE); Ruth Bieringer, Rimbach (DE); Dirk Ecknig, Ketsch (DE)

(73) Assignee: CARL FREUNDENBERG KG, Weinheim (DE)

( * ) Notice: Subject to any disclaimer, the term of this patent is extended or adjusted under 35 U.S.C. 154(b) by 244 days.

(21) Appl. No.: 14/296,982

(22) Filed: Jun. 5, 2014

(65) Prior Publication Data

US 2014/0364556 A1 Dec. 11, 2014

(30) Foreign Application Priority Data

Jun. 5, 2013 (EP) ..................................... 13002911

(51) Int. Cl.
*C08L 75/04* (2006.01)
(52) U.S. Cl.
CPC .................................... *C08L 75/04* (2013.01)
(58) Field of Classification Search
CPC ..................................................... C08L 75/04
See application file for complete search history.

(56) References Cited

U.S. PATENT DOCUMENTS

| | | |
|---|---|---|
| 4,104,210 A | 8/1978 | Coran et al. |
| 4,130,535 A | 12/1978 | Coran et al. |
| 4,311,628 A | 1/1982 | Abdou-Sabet et al. |
| 5,237,000 A | 8/1993 | Lausberg et al. |

FOREIGN PATENT DOCUMENTS

| | | |
|---|---|---|
| CN | 102161821 A | 8/2011 |
| DE | 4211415 A1 | 10/1993 |
| DE | 102008012516 A1 | 9/2009 |
| DE | 102008038280 A1 | 2/2010 |
| EP | 0337976 A2 | 10/1989 |
| EP | 0420017 A2 | 4/1991 |
| EP | 0594854 A1 | 5/1994 |
| EP | 0965607 A1 | 12/1999 |
| EP | 1672027 A1 | 6/2006 |
| EP | 2325249 A1 | 5/2011 |
| JP | 20-024343 A | 1/1990 |
| JP | H0224343 A | 1/1990 |
| JP | 07-053831 A | 2/1995 |
| JP | H0753831 A | 2/1995 |
| JP | 2001234006 A | 8/2001 |
| JP | 2004051872 A | 2/2004 |
| JP | 2010065220 A | 3/2010 |
| KR | 1020040011556 A | 2/2004 |

OTHER PUBLICATIONS

Machine English translation of JP 07-053831, Mitsushige et al., Feb. 1995.*
Davis, J. R., ed., Tensile Testing, Second Edition, Dec. 2004, pp. 155 and 156.*

* cited by examiner

*Primary Examiner* — Patrick D Niland
(74) *Attorney, Agent, or Firm* — Shumaker, Loop & Kendrick, LLP; James D. Miller

(57) ABSTRACT

It is the aim to indicate a thermoplastic elastomer composition which is characterized by particularly good temperature stability from −40° C. to +150° C. and a particularly good oil resistance, with particularly good physical properties, in particular with a high elongation at break, and which is suitable for use in moldings, injection moldings, extrudates and/or blow moldings. In addition, the thermoplastic elastomer composition according to the invention comprises a mixture of acrylate rubber and polyurethane.

13 Claims, No Drawings

THERMOPLASTIC ELASTOMER COMPOSITION AND USE THEREOF

CROSS-REFERENCE TO RELATED APPLICATIONS

This application claims priority to EP Pat. Appl. No. 13 002 911.9 filed Jun. 5, 2013. The entire disclosure of the above application is hereby incorporated herein by reference.

FIELD OF THE INVENTION

The invention relates to a thermoplastic elastomer composition and use thereof for producing moldings, injection moldings, extrudates and blow moldings.

BACKGROUND OF THE INVENTION

According to the structure and bonding ratios of macromolecules, polymers can be divided into the material groups of elastomers, thermoplastics and thermosets. A further material group comprises the thermoplastic elastomers. Thermoplastic elastomers (TPE) are polymers which have the use properties of elastomers and the processing properties of thermoplastics.

Thermoplastic elastomers based on mixtures of diene rubbers and polyolefins in general are described in U.S. Pat. No. 4,104,210, U.S. Pat. No. 4,130,535, and U.S. Pat. No. 4,311,628. These are used primarily for applications at temperatures below 120° C.

DE 10 2008 038 280 A1 and DE 10 2008 012 516 A1 disclose crosslinkable compositions based on at least one copolymer as thermoplastic elastomer and α-olefin-vinyl acetate copolymers with a vinyl acetate content of ≥40% by weight, where the compositions comprise a peroxide as crosslinking initiator.

EP 0 337 976 B1 and EP 0 965 607 B1 describe thermoplastic elastomer compositions based on a thermoplastic polyester resin and a dynamically vulcanized, covalently crosslinked acrylate rubber, and a process for producing a vulcanized blend.

EP 1 672 027 B1 shows a thermoplastic elastomer composition of a polyamide-based polymer and an acrylate rubber or a nitrile-copolymerized conjugated diene rubber. The production takes place by mixing in the rubber into the polyamide-based polymer and subsequent dynamic crosslinking of the rubber.

EP 0 594 854 B1 relates to a thermoplastic elastomer composition comprising thermoplastic copolyester elastomer or thermoplastic copolyamide elastomer and methacrylate or acrylate copolymer rubber which comprises an epoxy group, and methacrylate or acrylate copolymer rubber which comprises a carboxyl group.

EP 2 325 249 A1 claims a thermoplastic elastomer composition which comprises at least one thermoplastic elastomer, with the exception of thermoplastic polyurethane (TPU), and at least one filler from the group of silicas, precipitated silicates or carbon blacks.

A disadvantage of the thermoplastic elastomer compositions described above is that these frequently have an inadequate stability at high temperatures and in most cases an inadequate oil resistance.

SUMMARY OF THE INVENTION

The is a need to indicate a thermoplastic elastomer composition which is characterized by improved oil resistance and improved temperature stability, with particularly good physical properties, in particular with a high elongation at break. Furthermore, it should be simple to produce and be particularly well suited for producing moldings, injection moldings, extrudates, and blow moldings.

The present invention achieves the aforementioned object by means of the features of claim 1.

The thermoplastic elastomer composition according to the invention comprises a mixture of acrylate rubber and polyurethane.

Acrylate rubber is understood here as also meaning polyacrylate rubber (ACM) and/or ethylene-acrylate rubber (AEM).

Acrylate rubber here is the name for a crosslinkable or vulcanizable polymer from which elastomers can be produced by vulcanization or crosslinking, as well as the name for an already crosslinked acrylate rubber.

Depending on spatial structure, polyurethanes can be rigid and brittle, but also flexible and elastic. The thermosetting polyurethanes have spatially crosslinked building blocks in a rubber-like manner whereas the thermoplastic polyurethanes have a linear structure and can be melted. Consequently, the use of thermoplastic polyurethanes is preferred here. The material combination of the two selected base components acrylate rubber and polyurethane exhibits an unexpectedly good compatibility in the melt during the mixing process. As a result, a homogeneous phase morphology is obtained.

The thermoplastic elastomer composition resulting from this has a surprisingly high temperature and media stability, in particular in the presence of oils.

Furthermore, the thermoplastic elastomer composition according to the invention has exceptional physical properties, such as a high elongation at break and a high tensile strength, and it ages more slowly than known thermoplastic elastomer compositions.

The thermoplastic elastomer composition according to the invention can also be readily processed using molding processes, in particular by means of extrusion molding, injection molding and/or blow molding processes. Moreover, material excesses, defective products and also production wastes can be reutilized and recycled. This permits a simple, cost-effective and material-saving production of components and moldings with thermoplastic elastomer compositions.

Advantageously, the weight ratio of acrylate rubber to polyurethane in the thermoplastic elastomer composition is 9:1 to 1:9, preferably 8:2 to 2:8, particularly preferably 8:2 to 5:5, because in this case the acrylate rubber is present in a particularly homogeneous form in a matrix of polyurethane.

The acrylate rubber is polymerized from one or more monomers, preferably selected from $C_1$-$C_{16}$-alkyl acrylate, $C_1$-$C_{15}$-alkyl methacrylate, alkoxyalkyl acrylate, allyl methacrylate, diallyl methacrylate, comonomers thereof and/or mixtures thereof.

Preferably, the alkyl(meth)acrylates are selected from the group of methyl(meth)acrylate, ethyl(meth)acrylate, n-propyl(meth)acrylate, n-butyl(meth)acrylate, isobutyl(meth)acrylate, n-pentyl(meth)acrylate, isoamyl(meth)acrylate, n-hexyl(meth)acrylate, 2-methylpentyl(meth)acrylate, n-octyl(meth)acrylate, 2-ethylhexyl(meth)acrylate, n-decyl(meth)acrylate, n-dodecyl(meth)acrylate, n-octadecyl(meth)acrylate and/or mixtures thereof.

Particular preference is given to using ethyl acrylate (EA), butyl acrylate (BA) and/or methoxyethyl acrylate (MEA), particularly on account of their low-temperature flexibility and oil resistance.

The acrylate rubber preferably has functional groups, or for crosslinking the acrylate rubber preference is given to copolymerizing comonomers which are preferably selected from halogen-containing groups, such as, for example, chlorovinyl ether or vinyl chloroacetate, from carboxylic acid groups, such as, for example, acrylic acid, from hydroxy groups, from epoxy groups, such as, for example allyl glycidyl ether, and/or from mixtures thereof.

According to a further preferred embodiment, the polyurethane is produced by reacting a diisocyanate with a polyol and a chain extension agent.

Preferred diisocyanates are selected from hexamethylene diisocyanate, 2-methyl-1,5-pentamethylene diisocyanate, trans-cyclohexane 1,4-diisocyanate, 4,4'-dicyclohexylmethane diisocyanate, 2,4'-dicyclohexylmethane diisocyanate, 2,2'-dicyclohexylmethane diisocyanate, 1,4-benzene diisocyanate, 2,4-toluene diisocyanate, 2,6-toluene diisocyanate, 4,4'-diphenylmethane diisocyanate, 2,4'-diphenylmethane diisocyanate, 2,2'-diphenylmethane diisocyanate, 3,3'-dimethyl-4,4'-biphenyl diisocyanate, 4,4'-diisocyanato-1,2-diphenylethane, 2,4'-diisocyanato-1,2-diphenylethane, 2,2'-diisocyanato-1,2-diphenylethane, 1,5-naphthalene diisocyanate and/or mixtures thereof.

The polyol can be selected from polyester polyols, polylactone polyols, polyether polyols, polythioether polyols, polyester amide polyols, polycarbonate polyols, polyacetal polyols, vinyl polymer polyols, polycaprolactone polyols, polyether glycols, polyester glycols and/or mixtures thereof. The polyols are preferably long-chain dials.

Expediently the NCO/OH ratio in the polyurethane is in a range from 0.90 to 1.5, preferably in a range from 0.95 to 1.1.

Suitable chain extension agents for the polyurethane are dials, trifunctional or higher functional alcohols, diamines, higher functional amines, amino alcohols and/or mixtures thereof. The chain extension agents are preferably selected from short-chain dials.

According to a preferred embodiment, the polyurethane has a melting temperature in the range from 100 to 250° C., preferably in the range from 150 to 230° C.

Crosslinking agents preferably used for the thermoplastic elastomer compositions according to the invention for crosslinking the acrylate rubber are selected from peroxides, sulfur, diamines, polyamines, diaminecarbamates, diols, polyols, diisocyanates, polyisocyanates, diepoxides, polyepoxides, diglycidyl ethers, triazines, methylenedianiline, dicarboxylic acids, polycarboxylic acids and/or mixtures thereof or from substances which release the aforementioned substances.

Particularly preferred crosslinking agents are sulfur, hexamethylenediamine carbamate, hexamethylenediamine, octamethylenediamine and/or 2,2-bis [4-(4-aminophenoxy) phenyl] propanes.

The crosslinking agent binds or crosslinks the monomers of the acrylate rubber in places with one another by chemical bridges.

In a preferred embodiment, the crosslinking agent of the acrylate rubber used is an activator which is selected from potassium stearate, sodium stearate, sodium oleate, other alkali metal and alkaline earth metal salts of fatty acids, zinc dithiophosphate, zinc dibutyldithiocarbamate, zinc dimethyldithiocarbamate, iron dimethyldithiocarbamate, di-orthotolylguanidine (DOTG), diphenylguanidine (DPG), dipentamethylenethiuram disulfide, synthetic hydrotalcite, diuron, octadecyltriethylammonium bromide, octadecyltriethylphosphonium bromide, diazabicycloundecene (DBU), diethylthiourea, ammonium benzoate, trimercapto-s-triazine, sodium 2-ethylhexanoate and/or mixtures thereof.

Alternatively or cumulatively to the activator, the peroxide crosslinking agent used can be a coagent which is selected from 2,4,6-tris(allyloxy)-1,3,5-triazine (TAC), triallyl isocyanurate (TAIC), 1,2-polybutadiene, 1,2-polybutadiene derivatives, N,N'-phenylenebismaleimide, diacrylates, triacrylates, in particular trimethylpropane triacrylate, dimethacrylates and/or trimethacrylates, in particular trimethyloipropane trimethacrylate (TRIM).

Depending on the field of use, the thermoplastic elastomer composition according to the invention can comprise at least one additive which is selected from fillers, plasticizers, processing aids, anti-aging agents, antioxidants, flame retardants, dyes, pigments and/or mixtures thereof.

The additive can increase the physical properties such as, for example, the tensile strength or the elongation at break, of the thermoplastic elastomer composition. In addition, the additives can improve the haptics and/or the optics of the thermoplastic elastomer composition.

For example, fillers can increase the volume and/or the weight and/or improve the physical properties of the mixture. The filler is preferably selected from carbonates, oxides, carbon black, graphite, activated carbon, silicates, clay, mica, siliceous earth, chalk, kaolin, calcium sulfate, barium sulfate, aluminum hydroxide and/or mixtures thereof.

Fillers are preferably introduced into the acrylate rubber in order to implement the hardness and rigidity of the rubber. To improve the tensile strength, carbon black is preferably used as filler.

The thermoplastic elastomer composition can comprise plasticizers selected from phthalate esters, phosphates, trimellitate esters, sulfonamides and/or mixtures thereof.

According to a preferred embodiment, the thermoplastic elastomer composition can comprise an antioxidant selected from polycarbodiimides, substituted phenols, substituted bisphenols, dihydroquinoline, diphenylamine, phenylnaphthylamine, paraphenyldiamine, paraphenylenediamine, benzimidazole and/or mixtures thereof.

The mixing and the processing can take place either discontinuously or continuously.

The discontinuous mixing can take place in internal mixers with intermeshing or tangential rotor geometries, for example in Banbury mixers or Farrell mixers. A discontinuous production is particularly flexible, particularly in the event that different thermoplastic elastomer compositions are to be produced.

Alternatively preferred continuous mixing devices are screw machines, in particular co-rotating twin-screw extruders; single-screw extruders, multi-shaft extruders or Buss cokneaders. Here, the production takes place at high rotational speeds with increased productivity.

To produce the thermoplastic elastomer composition according to the invention, the mixing of acrylate rubber, polyurethane and optional additives can be carried out in a different order. Here, the acrylate rubber, the polyurethane and the additive(s) can be metered in as pellets, granules, powders or melts.

According to a preferred embodiment, the additives are firstly mixed and heated with the acrylate rubber. Expediently a comminution of the acrylate rubber and a particularly homogeneous mixing of acrylate rubber and the additives takes place e.g. in the internal mixer at a rotational speed in the range from 50 to 250 rpm.

After adding the polyurethane, temperature and rotational speed are preferably adjusted or increased such that the acrylate rubber is preferably dispersed in the polyurethane after complete melting.

The crosslinking of the acrylate rubber with the crosslinking agent can take place in the melt while mixing, i.e. in situ, particularly in accordance with the concept of dynamic crosslinking.

Preferably, the mixing is carried out under high shear conditions.

This can take place for example in an internal mixer or twin-screw extruder. The rotational speeds can be between 20 and 1200 rpm depending on the unit. For an internal mixer, these are preferably between 50 and 250 rpm; in the case of a twin-screw extruder these are preferably between 100 and 600 rpm.

Usually the acrylate rubber is crosslinked simultaneously and dispersed as fine particles within the polyurethane matrix. It is particularly favorable that the acrylate rubber is able to be distributed particularly uniformly in the polyurethane matrix on account of the unexpected compatibility between the polyurethane and the acrylate rubber.

A particularly homogeneous distribution of the acrylate rubber in the polyurethane matrix results for a particle size of the rubber in the range from 0.1 to 50 µm, preferably in the range from 0.1 to 20 µm. The mixing and/or crosslinking takes place preferably at a temperature in the range from 150 to 250° C., preferably in the range from 200 to 230° C.

Under the aforementioned crosslinking parameters of temperature and rotational speed, the acrylate rubber preferably initially introduced as main component is completely surrounded by the polyurethane, which is preferably used as minority component. On account of the homogeneous distribution of the acrylate rubber in the polyurethane matrix, the thermoplastic elastomer composition has particularly excellent tensile strengths and elongations at break.

After the mixing, the thermoplastic elastomer composition can be rolled out using laboratory rolls to give sheets. This facilitates further processing.

On account of their excellent thermoplastic processability, the thermoplastic elastomer compositions can be reshaped particularly well using thermoplastic processing processes, in particular by means of injection molding, extrusion molding, compression molding, extrusion, blow molding, injection-compression molding and/or Ossberger process.

The thermoplastic elastomer composition according to the invention moreover preferably has an operating-temperature range up to +150° C. Practical experiments have shown that the thermoplastic elastomer composition according to the invention has a particularly long service life on account of the high temperature stability. Aging can advantageously be minimized, such that the thermoplastic elastomer composition according to the invention also withstands the high requirements placed on moldings, for example for the area of use in the automobile industry.

The thermoplastic elastomer composition according to the invention preferably has a low-temperature flexibility up to −40° C. Low-temperature flexibility is understood as meaning the glass transition temperature or else freezing temperature at which there is a reversible transition from a viscoelastic or rubbery-elastic state to a rigid, noncrystalline, glass-like (amorphous) and brittle state.

Practical experiments have revealed that the thermoplastic elastomer composition according to the invention is preferably characterized by a higher tensile strength than the known thermoplastic elastomer compositions. The tensile strength is the force achieved at the moment of tear, based on the starting cross section of a test piece before the start of the test. The thermoplastic elastomer composition according to the invention can therefore be mechanically stressed to a particular extent.

The thermoplastic elastomer composition according to the invention has, preferably after storage for 70 hours at 150° C. in the presence of hot air and even after 168 hours, a residual elongation at break preferably of greater than 100%, particularly preferably of greater than 150%, measured in accordance with DIN 53504-S2. The elongation at break is the percentage ratio of the extension achieved at the moment of tear relative to the starting length.

The thermoplastic elastomer composition according to the invention is preferably characterized, even after storage for 70 hours at 150° C. in the presence of oil (IRM 903) and even after 168 hours, by a residual elongation at break preferably of greater than 100%, particularly preferably of greater than 140%, measured in accordance with DIN 53504-S2.

Preferably, the thermoplastic elastomer composition according to the invention has a hardness measured in accordance with DIN 53505 of 60 to 100 Shore A, further preferably of 70 to 95 Shore A.

As a result of the excellent strength values and the residual elongations both after hot-air aging and also after oil aging at 150° C. in each case, the elastomer composition according to the invention gives reason to expect a particularly high service life.

The thermoplastic elastomer composition according to the invention expediently has a volume change in oil (IRM 903) measured in accordance with DIN ISO 1817 of less than 15%, preferably of approximately or less than 10%. On account of the low volume swelling in oil, material damage of the thermoplastic elastomer composition is prevented and the service life is increased. This permits a use of the thermoplastic elastomer composition according to the invention in an engine or gear component where these come into contact with oils.

The thermoplastic elastomer composition according to the invention can have a tear-propagation resistance measured in accordance with ISO 34-1 Method A in the range from 1 to 20 N/mm, preferably in the range from 3 to 15 N/mm. The tear-propagation resistance is a measure of the sensitivity of elastomers against the tear propagation of cut and tear damage.

Consequently, the thermoplastic elastomer composition is characterized by a particularly high mechanical stability.

Furthermore, the thermoplastic elastomer composition, even after storage for 70 or 168 hours at 150° C. in the presence of hot air, can have a tensile modulus in the range from 2 to 10 MPa, measured in accordance with DIN 53504-S2, or after storage for 70 or 168 hours at 150° C. in the presence of oil a tensile modulus in the range from 2 to approximately 5 MPa. The tensile modulus is the force required for a certain elongation, based on the starting cross section.

Practical experiments have revealed that the thermoplastic elastomer composition, even after storage for 70 or 168 hours at 150° C. in the presence of hot air, is characterized preferably by a tensile strength measured in accordance with DIN 53504-S2 in the range from 1 to 15 MPa, or after storage for 70 or 168 hours at 150° C. in the presence of oil a tensile strength in the range from 3 to approximately 6.5 MPa. The tensile strength is the force achieved at the moment of tear, based on the starting cross section of a test piece, before the start of the test.

On account of their excellent physical properties, in particular their excellent tensile strength and elongation at break, the thermoplastic elastomer composition according to the invention is preferably used for producing moldings, such as injection moldings, extrudates and/or blow moldings.

On account of the above properties, the thermoplastic elastomer composition according to the invention is also suitable for producing hoses, bellows, seals, profiles, films and/or damping elements, particularly in the automobile sector.

On account of their excellent media resistance and temperature stability, the thermoplastic elastomer composition according to the invention can be used for producing drive elements in air- or media-conveying regions in the engine compartment or in the gear.

Further preferred fields of use of the thermoplastic elastomer composition according to the invention are the use for producing diaphragms, hoses, such as automobile hoses, charge-air tubes, air-intake tubes, fuel lines, brake hoses, oil cooler hoses, crankcase ventilation hoses (blow-by hoses) and/or exhaust-gas recirculation hoses, seals, in particular radial shaft sealing rings, lip seals, O rings, sealing rings, flat seals, molded-on seals and/or foam seals.

DETAILED DESCRIPTION OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, are not necessary or critical.

The thermoplastic elastomer composition according to the invention can be produced according to the following process:

The production of four different elastomer compositions according to the invention is shown below by way of example.

An internal mixer of the Rheomix OS® type from Haake is preheated to 100° C. The acrylate rubber and the additives are poured into the mixing unit and mixed at a rotational speed of about 100 rpm for about six minutes. The polyurethane with a melting point of about 180° C. is then added and brought to a temperature of about 210° C. at a rotational speed of about 160 rpm. At this temperature, the polyurethane melts and is mixed with the acrylate rubber.

After complete melting of the polyurethane and premixing of all components, the crosslinking agent is added after about 3 minutes.

While a crosslinking of the acrylate rubber arises at a rotational speed of 150 rpm under a temperature of 225° C., the rubber particles are comminuted to a particle size in the range from 0.1 to 20 μm by mechanical shearing of the kneader paddles.

Although a higher volume fraction of acrylate rubber (elastomer phase) is preferably present, after about three minutes a phase inversion occurs as a result of the low viscosity of the polyurethane (thermoplastic phase). This can also be detected microscopically. This means that the acrylate rubber preferably used as main component is completely surrounded by the polyurethane preferably used as minority component. The thermoplastic elastomer composition (thermoplastic vulcanizate) has a smooth surface and the acrylate rubber particles can no longer be identified macroscopically.

After about 10 minutes, the contents of the mixer are discharged at a temperature of about 225° C. and rolled out on a laboratory roll to give thin sheets. The sheets are processed using an injection molding machine (model Engel Combimelt Victory 200H/200L/80) to give test pieces of dimensions (100×100 mm area and 2 or 30×100 mm and 6 mm thickness). At the same time it can also be checked whether the processing behavior is suitable for the injection molding process.

The specified mixtures are prepared from the components listed in table 1. The use amounts are given in parts by weight per 100 parts of acrylate rubber.

TABLE 1

Various thermoplastic elastomer compositions according to the invention.

|  | Tradename/chemical name | 1 | 2 | 3 | 4 |
|---|---|---|---|---|---|
| Acrylate rubber | Noxtite ® AY1170 | 100 | 100 | 100 | 100 |
| Carbon black as filler | Corax ® N 550 | 40 | 40 | 50 | 68 |
| Plasticizer | Pristerene ® 4931 (stearic acid) | 1 | 1 | 1 | 1.5 |
| Plasticizer | Rhenosin ® W759 |  |  |  | 8 |
| Antioxidant | Dusantox ® 86 | 1.5 | 1.5 | 1.5 | 1.5 |
| Processing aid | Vanfre ® VAM (polyoxy-ethylene octadecyl ether phosphate) | 0.5 | 0.5 | 0.5 | 0.5 |
| Processing aid | Armeen ® 18D |  |  |  | 1.5 |
| Activator | Rhenogran ® XLA 60 (1,8-diazabicyclo-(5.4.0)undecene-7-zinc-dialkyldithiophosphate) | 1.5 | 1 | 1 | 1.2 |
| Crosslinking agent | Cheminox ® AC-6C (hexamethylenediamine carbamate) | 0.8 | 0.6 | 0.6 | 0.6 |
| Polyurethane | 94 AU 20889 | 62.3 | 62 | 66.3 | 98.4 |
| Total |  | 207.6 | 206.6 | 220.9 | 281.2 |

Table 2 below shows the physical properties and the elastomer-technological test values of the thermoplastic elastomer compositions according to the invention at room temperature.

TABLE 2

Physical properties of the four different thermoplastic elastomer compositions according to the invention.

|  | Example | | | |
|---|---|---|---|---|
|  | 1 | 2 | 3 | 4 |
| Tensile strength [MPa] | 3.2 | 4.3 | 5.2 | 9.3 |
| Elongation at break [%] | 153.8 | 164.7 | 136.3 | 192 |
| Tensile modulus 100% [MPa] | 2.6 | 3.2 | 4.7 | 6.5 |

(Tensile strength, elongation at break and tensile modulus measured in accordance with DIN 53504-S2

The thermoplastic elastomer compositions according to the invention have high elongation at break values.

Table 3 below measures and compares various physical properties of conventional thermoplastic elastomer compositions with the thermoplastic elastomer composition according to the invention (of example 4) at room temperature and at 150° C.

TABLE 3

Comparison of physical properties of a thermoplastic elastomer composition according to the invention with conventional thermoplastic elastomer compositions known from the prior art.

|  |  | Comparative examples | |
|---|---|---|---|
| Physical properties | Example 4 | Hipex ® HX 81 | Zeotherm ® 100-70 B |
| Hardness [Shore A] | 80 | 79 | 69 |
| Tensile modulus 100% [MPa] | 6.5 | 7.3 | 5.1 |
| Tensile strength [MPa] | 9.3 | 8.2 | 5.7 |
| Elongation at break [%] | 192 | 171 | 122 |
| Tear-propagation resistance [N/mm] | 12.3 | 10.7 | 64.1 |
| Properties at 150° C. | | | |
| Tensile strength [MPa] | 0.7 | 1.2 | 2 |
| Elongation at break [%] | 164 | 39 | 64 |

(Hardness measured in accordance with DIN 53505; tensile modulus, tensile strength and elongation at break measured in accordance with DIN 53504-S2; tear-propagation resistance measured in accordance with ISO 34-1 Method A)

The thermoplastic elastomer composition Hipex® is described in DE 10 2008 038 280 A1 and DE 10 2008 012 516 A1.

The thermoplastic elastomer composition Zeotherm® is described in EP 1 672 027 B1.

As a comparison of the thermoplastic elastomer composition according to the invention with the known thermoplastic elastomer compositions Hipex® and Zeotherm® shows, the elongation at break measured at 150° C. of the known thermoplastic elastomer compositions in particular drops significantly.

An elastic thermoplastic elastomer composition should, in order to be suitable for an application in the engine compartment, have an elongation at break of more than 100%, preferably of more than 140%, at a temperature of 150° C. This is the case for the thermoplastic elastomer compositions according to the invention.

Furthermore, the media resistance at 150° C. for various residence times in the presence of air and oil (IRM 903) was investigated for the thermoplastic elastomer composition according to the invention, shown by way of example on the thermoplastic elastomer composition of example 4. The resulting physical properties are listed in tables 4 and 5.

TABLE 4

Comparison of the physical properties of a thermoplastic elastomer composition according to the invention with conventional thermoplastic elastomer compositions known from the prior art following storage in the presence of hot air (150° C.).

| | | | Comparative examples | |
|---|---|---|---|---|
| | Aging in hot air at 150° C. | Example 4 | Hipex ® HX 81 | Zeotherm ® 100-70 B |
| after 24 h | Hardness [Shore A] | 82 | 74 | 73 |
| | Tensile modulus 100% [MPa] | 7.9 | 6.7 | 5.5 |
| | Tensile strength [MPa] | 11.8 | 8 | 5.4 |
| | Elongation at break [%] | 189 | 184 | 103 |
| after 70 h | Hardness [Shore A] | 83 | 76 | 74 |
| | Tensile modulus 100% [MPa] | 9.1 | 6.6 | — |
| | Tensile strength [MPa] | 13.4 | 8.4 | 4.3 |
| | Elongation at break [%] | 182 | 202 | 84 |
| after 168 h | Hardness [Shore A] | 83 | 79 | 74 |
| | Tensile modulus 100% [MPa] | 10 | 6.5 | 5.7 |
| | Tensile strength [MPa] | 13.9 | 8.7 | 5.2 |
| | Elongation at break [%] | 162 | 210 | 96 |

(Hardness measured in accordance with DIN 53505; tensile modulus, tensile strength and elongation at break measured in accordance with DIN 53504-S2).

In the case of the known thermoplastic elastomer composition Zeotherm®, after hot-air aging, a drop in the tensile modulus and elongation at break values can lead to fracture. As a result, use for long-term stresses in air-conveying components is possible only to a limited extent.

TABLE 5

Comparison of the physical properties of a thermoplastic elastomer composition according to the invention with conventional thermoplastic elastomer compositions known from the prior art following storage at 150° C. in the presence of oil (IRM 903).

| | | | Comparative examples | |
|---|---|---|---|---|
| | Resistance in oil (IRM 903) at 150° C. | Example 4 | Hipex ® HX 81 | Zeotherm ® 100-70 B |
| after 24 h | Hardness [Shore A] | 71 | 58 | 75 |
| | Tensile modulus 100% [MPa] | 5.1 | — | 5.9 |
| | Tensile strength [MPa] | 7.1 | 3.1 | 5.9 |
| | Elongation at break [%] | 164 | 74 | 106 |
| after 70 h | Hardness [Shore A] | 71 | 55 | 78 |
| | Tensile modulus 100% [MPa] | 4.8 | — | 5.9 |
| | Tensile strength [MPa] | 6.5 | 2.7 | 5.9 |
| | Elongation at break [%] | 159 | 66 | 104 |
| after 168 h | Hardness [Shore A] | 71 | 55 | 79 |
| | Tensile modulus 100% [MPa] | 5.1 | — | — |
| | Tensile strength [MPa] | 6.6 | 2.3 | 5.8 |
| | Elongation at break [%] | 145 | 65 | 97 |

(Hardness measured in accordance with DIN 53505; tensile modulus, tensile strength and elongation at break measured in accordance with DIN 53504-S2)

TABLE 6

Comparison of the oil swelling of a thermoplastic elastomer composition according to the invention with conventional thermoplastic elastomer compositions known from the prior art following storage at 150° C. in the presence of oil (IRM 903).

| Swelling | | | Comparative examples | |
|---|---|---|---|---|
| In oil (IRM 903) at 150° C. | | Example 4 | Hipex ® HX 81 | Zeotherm ® 100-70 B |
| after 24 h | Volume change [%] | 12.4 | 65.1 | 4.9 |
| after 70 h | Volume change [%] | 11.5 | 65.6 | 6.2 |
| after 168 h | Volume change [%] | 10.1 | 65.3 | 6.0 |

(Volume change measured in accordance with DIN ISO 1817)

In the case of the known thermoplastic elastomer composition Hipex®, an increased oil swelling can lead to material damage. This composition is therefore not suitable for long-term use in oil-conveying or oil-contacting components in the engine compartment or gear.

Surprisingly, it could be found that the thermoplastic elastomer composition according to the invention has excellent physical properties, particularly high elongation at break and high tensile strength. Particularly after long-term aging of a week (168 hours), the thermoplastic elastomer composition according to the invention still exhibits no damage. The thermoplastic elastomer compositions according to the invention thus have an extraordinary media resistance over a long period to the action of heat and in the presence of oil.

While certain representative embodiments and details have been shown for purposes of illustrating the invention, it will be apparent to those skilled in the art that various changes may be made without departing from the scope of the disclosure, which is further described in the following appended claims.

What is claimed is:

1. A thermoplastic elastomer composition comprising a mixture of an acrylate rubber and a polyurethane, wherein the mixture is formed by simultaneously crosslinking and mixing a melt consisting essentially of the acrylate rubber with the polyurethane, a weight ratio of the acrylate rubber to the polyurethane is 8:2 to 5:5, the acrylate rubber is distributed homogeneously in a matrix of the polyurethane, a tensile strength of the thermoplastic elastomer composition after storage for 70 hours at 150° C. in the presence of oil measured in accordance with DIN 53504-S2 is from 3 to about 6.5 MPa, and the acrylate rubber comprises one of ethyl acrylate (EA), butyl acrylate (BA), and methoxyethyl acrylate (MEA).

2. The thermoplastic elastomer composition as claimed in claim 1, wherein the acrylate rubber has functional groups selected from halogen-containing groups, carboxylic acid groups, hydroxy groups, epoxy groups, and mixtures thereof.

3. The thermoplastic elastomer composition as claimed in one claim 1, wherein the polyurethane is produced by reacting a diisocyanate with a polyol and a chain extension agent.

4. The thermoplastic elastomer composition as claimed in claim 3, wherein the polyol is selected from polyester polyols, polylactone polyols, polyether polyols, polythioether polyols, polyester amide polyols, polycarbonate polyols, polyacetal polyols, vinyl polymer polyols, polycaprolactone polyols, polyether glycols, polyester glycols, and mixtures thereof.

5. The thermoplastic elastomer composition as claimed in claim 3, wherein the chain extension agent is selected from diols, trifunctional or higher functional alcohols, diamines, higher functional amines, amino alcohols, and mixtures thereof.

6. The thermoplastic elastomer composition as claimed in claim 1, wherein a crosslinking agent is used for crosslinking the acrylate rubber, and wherein the crosslinking agent is a member selected from the group consisting of: peroxides; sulfur; diamines; polyamines; diamine carbamates; diols; polyols; diisocyanates; polyisocyanates; diepoxides; polyepoxides; diglycidyl ethers; triazines; methylenedianiline; dicarboxylic acids; polycarboxylic acids; substances which release peroxides, sulfur, diamines, polyamines, diamine carbamates, diols, polyols, diisocyanates, polyisocyanates, diepoxides, polyepoxides, diglycidyl ethers, triazines, methylenedianiline, dicarboxylic acids, or polycarboxylic acids; and mixtures thereof.

7. The thermoplastic elastomer composition as claimed in claim 1, wherein the thermoplastic elastomer composition comprises at least one additive which is selected from fillers, plasticizers, processing aids, anti-aging agents, antioxidants, flame retardants, dyes, pigments, and mixtures thereof.

8. The thermoplastic elastomer composition as claimed in claim 1, wherein an operating-temperature of the thermoplastic elastomer composition is in the range from −40° C. to +150° C.

9. The thermoplastic elastomer composition as claimed in claim 1, wherein a residual elongation of the thermoplastic elastomer composition at break after storage for 70 hours at 150° C. in the presence of oil (IRM 903) measured in accordance with DIN 53504-S2 is between 100% and 160%.

10. The thermoplastic elastomer composition as claimed in claim 1, wherein a hardness of the thermoplastic elastomer composition measured in accordance with DIN 53505 is 60 to 100 Shore A.

11. The thermoplastic elastomer composition as claimed in claim 1, wherein a volume change of the thermoplastic elastomer composition in oil (IRM 903) measured in accordance with DIN ISO 1817 is less than 15%.

12. The thermoplastic elastomer composition as claimed in claim 1, wherein a tear-propagation resistance of the thermoplastic elastomer composition measured in accordance with ISO 34-1 Method A is in a range from 1 to 20 N/mm.

13. The thermoplastic elastomer composition as claimed in claim 1, wherein the thermoplastic elastomer composition is suitable for producing at least one of moldings, injection moldings, extrudates, and blow moldings.

* * * * *